(No Model.)
W. F. WARDEN.
OIL FILTER.
No. 587,348. Patented Aug. 3, 1897.
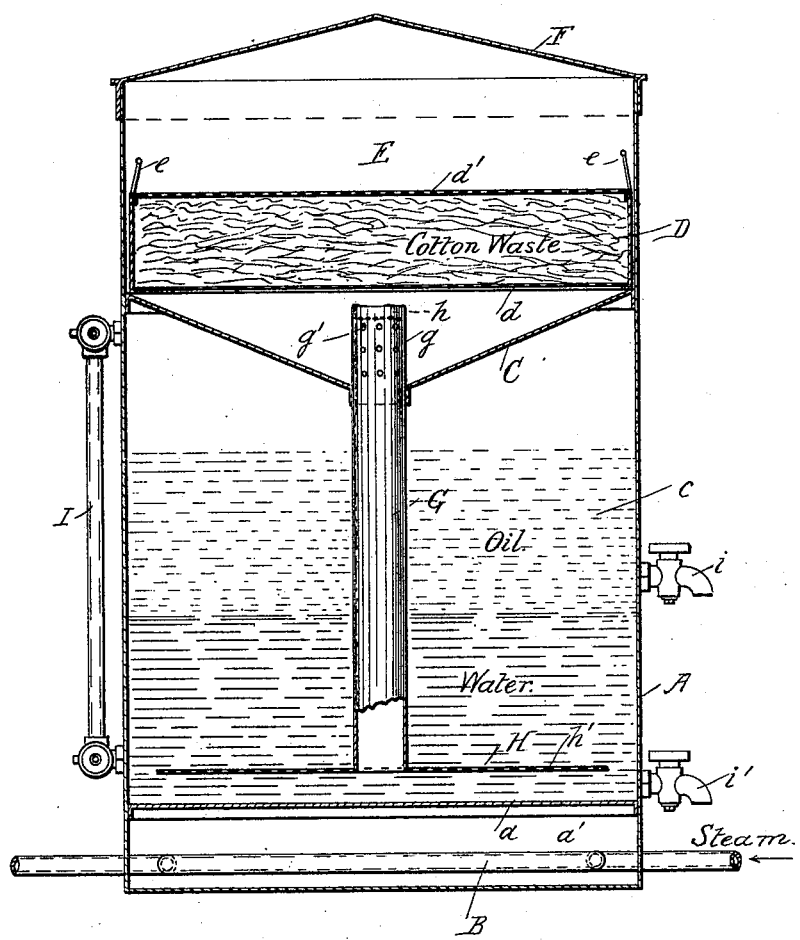

UNITED STATES PATENT OFFICE.

WILLIAM F. WARDEN, OF AKRON, OHIO.

OIL-FILTER.

SPECIFICATION forming part of Letters Patent No. 587,348, dated August 3, 1897.

Application filed March 3, 1897. Serial No. 625,831. (No model.)

*To all whom it may concern:*

Be it known that I, WILLIAM F. WARDEN, a citizen of the United States, residing at Akron, in the county of Summit and State of Ohio, have invented certain new and useful Improvements in Oil-Filters; and I do hereby declare the following to be a full, clear, and exact description of the invention, such as will enable others skilled in the art to which it appertains to make and use the same.

This invention relates to filters; and it consists in the novel construction and combination of the parts hereinafter fully described and claimed.

The drawing shows a vertical section through the filter.

A is a vessel having a false bottom $a$, forming a chamber $a'$.

B is a steam-heating pipe coiled in the chamber $a'$ below the false bottom.

C is a conical plate secured in the upper part of the vessel A and forming a chamber $c$ for oil and water between it and the false bottom $a$.

D is a removable pan provided with a perforated bottom $d$ and a perforated cover $d'$. The pan D is provided with handles $e$ for lifting it out of the dirty-oil chamber E above the conical plate C.

F is a cover for the vessel A.

G is is a pipe depending centrally from the bottom of the conical plate C. The pipe G has its upper end portion $g$ projecting above the bottom of the conical plate C and provided with rows of small perforations $g'$.

The top end of the pipe G is closed by a plug $h$. Any approved form of plug which will close the end of the pipe can be used.

H is a horizontal disk secured to the bottom of the pipe G and provided with small perforations $h'$.

I is a gage, and $i$ and $i'$ are faucets connected to the vessel A.

The pan D is filled with filtering material, such as cotton-waste, for removing the larger impurities from the dirty oil which is poured into the top of the chamber A. The partially clean oil sinks through the perforated bottom of the pan and is collected by the conical plate C. The oil passes through the pipe G and spreads out in a thin film on the under side of the disk H. The water in the bottom of the vessel A is heated by contact with the false bottom $a$ without coming in direct contact with the steam-pipe, so that the water in the vessel A never becomes too hot and the oily impurities which settle on the false bottom $a$ are never brought in contact with a surface which is hot enough to burn the oil adhering to them. The oil is rendered very fluid by contact with the hot water, and it passes upward in very fine streams or drops through the perforations $h'$. The fine drops of oil are washed by contact with the hot water and the dirt sinks to the bottom of the water. The pure oil rises and floats on the top of the water and is removed through the faucet $i$. The dirty water and sediment are removed through the faucet $i'$, and the height of the water and oil in the vessel A is observed by means of the gage I. The oil passes in a small even stream down the pipe G, being regulated by the area of the perforations $g'$. When the lower perforations become stopped up, the oil rises around the upper end portion of the pipe and some of it passes down the pipe by the upper row of perforations, so that the flow of oil down the pipe is kept constant.

What I claim is—

In an oil-filter, the combination, with a vessel for holding water, and a conical plate in the upper part thereof; of a pipe projecting above the said plate and provided with rows of perforations at different levels in that portion of it above the said plate, and a flat disk provided with small perforations and secured level with the bottom of the said pipe, substantially as set forth.

In testimony whereof I affix my signature in presence of two witnesses.

WILLIAM F. WARDEN.

Witnesses:
   T. E. ROLEY,
   WM. A. MARTIN.